3,130,174
MAGNESIUM OXYCHLORIDE CEMENTS

William G. Lloyd and Thomas E. Durocher, Bay City, Mich., assignors to The Dow Chemical Company, Midland, Mich., a corporation of Delaware
No Drawing. Filed Dec. 2, 1960, Ser. No. 73,185
13 Claims. (Cl. 260—41)

The present invention relates to magnesium oxychloride cements having improved wet strength characteristics. More particularly, the invention concerns magnesium oxychloride cements containing a minor proportion of a polymeric polysulfonium composition.

Magnesium oxychloride cements are made by mixing calcined or caustic magnesia (magnesium oxide), a suitable filler or aggregate and an aqueous solution of magnesium chloride which is frequently termed "a gauging solution." Upon being thoroughly mixed in suitable proportions, these materials form a plastic mass which may be cast, poured, molded, extruded, pressed or foamed, depending upon the relative quantities of the constituents, special additives and the type of aggregate employed to provide a wide variety of useful articles. When exposed to air, with or without the aid of heat, the shaped plastic mass dried into a hard cement. These cements, which otherwise exhibit highly desirable properties, deteriorate upon continuous or intermittent exposure to water, thus rendering the cement inapplicable for uses where good weathering properties are an important criterion. This problem has been the subject of extensive investigation in the art and as a result numerous additives have been proposed to improve the moisture resistance or wet strength of magnesium oxychloride cements. The advantages resulting from the use of such additives, as have been proposed, have varied widely in effectiveness and economic practicality.

It is, therefore, desirable and among the objects of the present invention to provide novel additives for magnesium oxychloride cements capable of minimizing water-induced deterioration of the cement. It is especially an object of the invention to provide such an additive which is effective in relatively low concentrations. A further object is to provide such an additive which can be effectively incorporated into cured or set magnesium oxychloride cements. A still further object is to provide an improved magnesium oxychloride cement composition having improved resistance to the degradative action of water. Other objects and benefits will become manifest hereinafter as the invention is more fully described.

In accordance with the present invention, it has been discovered that the resistance of magnesium oxychloride cements to the deleterious influence of water is substantially improved by incorporating into the cement a minor proportion, for example, at least about 0.02 and up to an effective upper limit of about 3 percent by weight of the cement, of a water-soluble polymeric polysulfonium composition containing in chemically combined form at least a substantial proportion of a monomer having the following general formula:

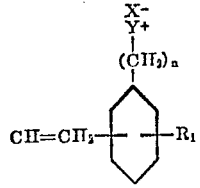

wherein $R_1$ is selected from the group consisting of hydrogen, halogens and alkyls having up to 6 carbon atoms, Y is a divalent, sulfur-containing, organic radical having its valences on the sulfur atom, said radical being derived from aliphatic and cycloaliphatic organic sulfides having from 2 up to 12 carbon atoms, X is a counter anion, preferably a halide such as chloride or bromide, and $n$ is an integer from 1 to 4.

More particularly, Y corresponds to the following formula

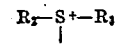

wherein $R_2$ and $R_3$ separately represent monovalent radicals such as, for example, alkyls, haloalkyls, hydroxyalkyls, carboxyalkyls, acyloxyalkyls, carboalkoxyalkyls, carbamoylalkyls, alkylcarbamoylalkyls, alkylamidoalkyls and $$(C_aH_{2a}Z)_bC_aH_{2a}$$

radicals wherein Z is selected from the group consisting of oxygen and sulfur, $a$ is an integer from 2 to 4, $b$ is at least 1, said monovalent radicals having from 1 up to 12 carbon atoms. Taken together, $R_2$, $R_3$ and S represent a cyclic, saturated organic sulfide radical having from 4 to 6 ring carbon atoms which may contain substituents such as halogen, alkyl, amino, hydroxyl and the like groups.

Normally, the above-described sulfonium compounds, as produced, will have a halide counter anion. If desired, however, the halide form of the sulfonium group can be converted in a conventional manner to any one of a number of common anionic forms such as carbonate, nitrate, sulfate, acetate and the like by passing a solution of the monomer or polymer in which it is combined through an anion exchange resin bed in the proper salt form.

The preferred polymeric polysulfonium additives of the invention correspond to homo- and copolymers of the above-described monomeric materials. However, some benefit in accordance with the invention is obtained with any water-soluble polymer corresponding to a copolymer of the above-described sulfonium substituted monomers and other ethylenically unsaturated hydrophobic and/or hydrophilic monomers, which polymer contains at least a substantial proportion of the sulfonium substituted monomeric materials, e.g., at least about 20 percent of the total combined monomers. Note that while lesser amounts of the hydrophilic sulfonium substituted monomers can be employed with other comonomers to prepare the water-soluble polymeric additives of the invention, it is often necessary, when hydrophobic comonomers are employed, to maintain the proportion of the hydrophilic monomers employed above at least about 65 percent of the total combined monomers in order to insure water solubility in the resulting copolymer.

The polymeric polysulfonium additives of the invention can be either linear or lightly cross linked. Their molecular weight is not critical with regard to operability as some benefit is obtained in accordance with the invention with polymeric polysulfonium additives having molecular weights as low as about 1000. Higher molecular weights, however, such as may be obtained in lightly cross-linked polymers so long as they are not so highly cross linked as to be water insoluble, are preferred.

The linear polymeric polysulfonium additives can be directly prepared by homopolymerization of an ar-vinyl-aralkyl sulfonium compound or by copolymerizing at least one such ar-vinyl-aralkyl sulfonium compound with one or more ethylenically unsaturated monomers by any convenient method such as those conventionally employed to polymerize the free radical catalyzed vinyl systems. For this purpose, mass, emulsion or solution polymerization techniques employed in conjunction with such polymerization initiating means as actinic light, ultraviolet radiation, gamma radiation, "azo" catalysts and peroxides are adaptable with such modifications as are necessary to accommodate the particular properties and reaction characteristics of the monomeric reactants to provide effective means of preparation.

Water-soluble linear polymeric polysulfoniums can also be prepared by reacting an organic sulfide with a linear polymer containing in chemically combined form at least a substantial proportion, e.g., at least about 20 percent, when the comonomer is water-soluble, or at least about 65 percent, when the comonomer is hydrophobic, of the combined monomers of an ar-vinyl-aralkyl halide. Preferably, such a method of preparation is limited to reactions with organic sulfides in which at least one of the organic substituents on the sulfur atom contains no more than 2 carbon atoms.

The foregoing method of preparation is specifically illustrated by contacting a homopolymer of vinylbenzyl chloride with a stoichiometric quantity of an organic sulfide such as dimethyl sulfide in a mass reaction at a temperature from about 20° to about 70° C. to provide a polymeric polysulfonium chloride corresponding to a homopolymer of dimethyl(ar-vinylbenzyl) sulfonium chloride.

Other polymers within the scope of the invention that can be prepared by one of the foregoing preparative methods include, for example, poly-bis(2-hydroxyethyl)ar-vinylbenzyl sulfonium chloride, poly-bis(2-carboxyethyl)ar-vinylbenzyl sulfonium chloride, poly-2-hydroxyethyl methyl ar-vinylbenzyl sulfonium chloride, poly-bis(2-carbamoylethyl)ar-vinylbenzyl sulfonium chloride and the like.

Preferred polymeric polysulfonium compositions are high molecular weight, lightly cross-linked, water-soluble polymeric polysulfonium microgels. Such polymers can be prepared in a manner similar to that employed for the preparation of the linear polymers except that a small quantity of a cross-linking agent such as, for example, divinylbenzene is employed in the polymerization reaction. Illustratively, a small amount of a divinyl cross-linking agent is copolymerized with an alkenyl aromatic monomer substituted with either a sulfonium halide group, in which instance a cross-linked polymeric polysulfonium halide is directly prepared, or a haloalkyl group, in which instance a cross-linked, haloalkyl substituted polymer is prepared, which can be subsequently converted to a polysulfonium halide by means of a mass reaction with a suitable organic sulfide.

Cross-linking agents suitable for the above purpose include diolefins such as divinylbenzene, divinyl ether of ethylene glycol, ethylene glycol diacrylate, ethylene glycol dimethacrylate, glycerol trimethacrylate, diallyl itaconate, diallyl maleate, diallyl fumarate, diisopropenyldiphenyl and the like.

To provide lightly cross-linked and high molecular weight but yet water-soluble polymers, it is necessary to employ at least about 0.01 percent up to an effective upper limit of about 1 percent by weight of the total polymer of the diolefinic cross-linking agent. Generally, it is preferred to employ about 0.05 percent by weight of the cross-linking agent.

The method for making the water-soluble, lightly cross-linked, polymeric polysulfonium halides involving first preparing a lightly cross-linked polymer of an ar-vinyl-aralkyl halide and subsequently converting it to the polymeric polysulfonium halide by means of a reaction with an organic sulfide, is further delineated in a copending application Serial No. 738,939, filed June 2, 1958 and now abandoned.

Conventionally, magnesium oxychloride cements contain, as active ingredients, from about 30 to 60 percent magnesium oxide, 10 to 20 percent magnesium chloride and 30 to 50 percent water, the percentages being weight percentages based on the total weight of the active ingredients. Also contemplated are modified magnesium oxychloride cements in which some portion of the magnesium chloride is replaced with an equivalent amount of magnesium sulfate. A ratio of the total active ingredients to the fillers or aggregates usually employed is advantageously maintained within a range from about 1:1 to 1:8.

The polymeric polysulfonium additives of the invention can be incorporated into the magnesium oxychloride cements either by adding them to the formulation from which the cements are prepared or by directly dispersing them into previously prepared cements. In the latter instance, the cements are immersed in or otherwise contacted with aqueous solutions of the polymeric sulfonium additives.

When incorporated into the formulation of active ingredients, the polymeric polysulfonium additives may be added as a portion of the gauging solution, i.e., aqueous magnesium chloride solution. While this method conveniently produces a cement throughout which the additive is uniformly distributed, very good results are also obtained when the polymeric polysulfonium additives of the invention are incorporated into magnesium oxychloride cements that have been previously set.

The latter mode of operation may be accomplished by spraying, spreading or pouring an aqueous solution of the polymer onto the cement surface or by dipping cement articles into an aqueous solution of the polymer. The water solution of the polymer penetrates the interstices of the set cement, carrying into the cement dissolved quantities of the polymer which remain in situ upon evaporation of the water.

The amount of the polymeric polysulfonium additives incorporated either directly into the cement by means of the gauging solution or by means of subsequent treatments with aqueous solutions of the polymer is sufficient to provide from at least about 0.02 up to an effective upper limit of about 3 percent by weight of the cement of the polymeric additive for effective inhibition of water or moisture-induced deterioration in the cement.

While the present invention is in no way predicated upon an understanding of the theoretical basis of the invention, it is believed the polymeric sulfonium compositions of the invention undergo a decomposition reaction upon the drying of the cement composition to provide water-insoluble residues which achieve the benefits of the invention. Such decomposition may be promoted or accelerated by the application of heat to the treated cement at moderate temperatures, e.g., from about 40° to about 100° C. Heating of the cement is not necessary for operability, however, since the decomposition reaction occurs, though at a somewhat slower rate, as the cement dries at temperatures as low as about 5° C. At the lower temperatures, extended curing periods, e.g., from one to several weeks, may be necessary before the full benefit of the treatment according to the invention is realized.

The following examples are illustrative of the present invention and are not to be construed as limitations thereof.

EXAMPLE 1

A magnesium oxychloride cement was prepared by mixing 400 grams of a magnesium oxychloride dry mix containing 30 percent magnesium oxide, 52 percent Ottawa sand, 15 percent silica flour and 3 percent asbestos fiber with 150 milliliters of a gauging solution prepared by dissolving 234 grams of magnesium chloride hexahydrate and about 2.1 grams of a lightly cross-linked poly-(dimethyl)ar-vinylbenzyl sulfonium chloride in 266 grams of deionized water. The mixture of the dry mix and gauging solution was stirred until the resulting composition had a smooth, pasty consistency. The cement composition was then molded into test specimens in the shape of discs, 1⅞ inches in diameter and ½ inch thick. The test specimens were allowed to air dry for 7 days at room temperature and then heat treated at 100° C.

for 5 hours. The specimens were then immersed in water at about 22° C. for a period of time as specified in the following Table 1. Upon removal from the water, the specimens were blotted to remove excess water and subjected to compressive strength tests in a 50,000 pound Baldwin Southwork compression testing machine which was employed at a loading rate of about 10,000 pounds per minute.

A control magnesium oxychloride cement composition was similarly prepared with the exception that 145 milliliters of a gauging solution having the same concentration of $MgCl_2$ but not the polymeric additive of the invention, was employed with 400 grams of the same dry mix. Identical test specimens prepared from the control cement composition were tested in the same manner.

Average results of the compressive strength tests obtained with the polymer-modified and control cement specimens under dry conditions and upon prolonged contact with water are reported in the following table:

Table 1

| Condition | Average Compressive Strengths | |
|---|---|---|
| | Control Cement, pounds | Treated Cement, pounds |
| Dry | 9,500 | 9,300 |
| Immersed in H₂O, 1 hr | 9,500 | 9,900 |
| Immersed in H₂O, 72 hrs | 6,400 | 8,700 |

EXAMPLE 2

A previously prepared magnesium oxychloride cement containing expandable polystyrene as a filler or extender was cut into several test specimens 1.9 inches square by 0.5 inch thick and dipped in a 0.4 percent or a 0.8 percent solution of the poly-(dimethyl)ar-vinylidene sulfonium chloride employed in Example 1 or in deionized water for a period of 1 hour. Three samples were given each treatment. All samples were then weighed to determine the quantity of solution or water absorbed and subsequently dried according to a schedule of 2 hours at 40° C., 2 hours at 50° C. and 4 hours at 100° C. On the basis of the quantity of solution absorbed by the cement test specimens, it was determined that the group of specimens treated with the 0.4 percent polymer solution, hereinafter designated "A," contained an average of about 0.07 percent of the polymeric additive per specimen and the group of test specimens treated with the 0.8 percent polymer solution, hereinafter designated "B," contained an average of about 0.15 percent of the polymeric additive of the invention per specimen.

The test specimens were then immersed in water for 2 hours, after which they were removed from the water and blotted to remove excess water. They were then subjected to compression tests in accordance with the procedure of Example 1. The average compressive strengths for the three test specimens of groups "A" and "B" were 1747 pounds and 1933 pounds, respectively. The average compressive strength of three control specimens was 1653 pounds.

In a manner similar to that of the foregoing examples, moisture resistance and improved wet strength is imparted to magnesium oxychloride cements by substituting for the polymeric polysulfonium halides employed in the foregoing examples, linear and lightly cross-linked, water-soluble polymeric polysulfonium halides obtained as the mass reaction product of a poly-(ar-vinylbenzyl) chloride and an organic sulfide such as diethyl sulfide, dipropyl sulfide, butyl methyl sulfide, di-2-hydroxyethyl sulfide, 2-hydroxyethyl ethyl sulfide, benzyl methyl sulfide, 2-hydroxyethyl carboxymethyl sulfide, 2-hydroxyethyl-(carboxymethyl sodium salt) sulfide, methyl polyethylene oxide sulfide, methyl 2-hydroxyethyl sulfide, di-2-carboxyethyl sulfide, methyl carbamoylmethyl sulfide, methyl carbamoylethyl sulfide, 2,3-dihydroxypropyl methyl sulfide, methyl 2-carbamoylethyl methyl sulfide, (carboxyamyl potassium salt) methyl sulfide, (carboxymethyl potassium salt) methyl sulfide, carbobutoxymethyl ethoxyethyl sulfide, methyl acetyloxyethyl sulfide, 2-chlorohexyl methyl sulfide, 2-hydroxyhexyl methyl sulfide, butoxyethyl carbamoylpropyl sulfide, 3-oxohexyl methyl sulfide, tetrahydrothiophene and 2-methyl tetrahydrothiophene.

While the present invention has been described primarily in terms of oxychloride cements, it is to be understood that any portion of the magnesium chloride in the gauging solution may be replaced by an equivalent amount of magnesium sulfate to provide an improved magnesium oxychloride-magnesium oxysulfate or magnesium oxysulfate cement.

What is claimed is:

1. A composition of matter comprising a magnesium oxychloride cement containing an effective quantity of at least about 0.02 up to about 3 percent by weight of the cement of a water-soluble, polymeric polysulfonium composition containing in chemically combined form at least a substantial proportion of a monomer having the general formula:

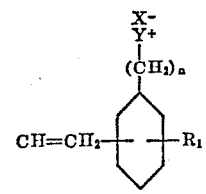

wherein $R_1$ is selected from the group consisting of hydrogen, halogens and alkyls having up to 6 carbon atoms, Y is a divalent, sulfur-containing, organic radical having its valances on the sulfur atom, said radical being derived from aliphatic and cycloaliphatic organic sulfides having from 2 up to 12 carbon atoms, X is a counter anion and $n$ is an integer from 1 to 4.

2. A composition as in claim 1 wherein the polymeric polysulfonium composition is lightly cross linked with up to about 1 percent by weight of the polymeric composition of a diolefinic cross-linking agent.

3. A composition as in claim 1 wherein the counter anion of the sulfonium group is a halogen.

4. A composition of matter as in claim 1 wherein the divalent, sulfur-containing organic radical has the general formula:

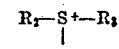

wherein $R_2$ and $R_3$ separately represent monovalent radicals selected from the group consisting of alkyls, haloalkyls, hydroxyalkyls, carboxyalkyls, acyloxyalkyls, carboalkoxyalkyls, carbamoylalkyls, alkylcarbamoalkyls, and $(C_aH_{2a}Z)_bC_aH_{2a}$-radicals wherein Z is selected from the group consisting of oxygen and sulfur, $a$ is an integer from 2 to 4, $b$ is at least 1 said monovalent radicals having from 1 up to 12 carbon atoms and $R_2$, $R_3$ and S taken together represent a cyclic, saturated organic sulfide having from 4 to 6 ring carbon atoms.

5. A composition as in claim 1 wherein the polymeric polysulfonium composition is poly-(dimethyl)ar-vinylbenzyl sulfonium chloride.

6. A composition as in claim 1 wherein the polymeric polysulfonium composition is poly-(diethyl)ar-vinylbenzyl sulfonium chloride.

7. A composition as in claim 1 wherein the polymeric polysulfonium composition is poly-bis(2-hydroxyethyl)-ar-vinylbenzyl sulfonium chloride.

8. A composition as in claim 1 wherein the polymeric polysulfonium composition is poly-bis(2-carboxyethyl)ar-vinylbenzyl sulfonium chloride.

9. A composition as in claim 1 wherein the polymeric polysulfonium composition is poly-bis(carbamoylmethyl)-ar-vinylbenzyl sulfonium chloride.

10. A method for improving the resistance of magnesium oxychloride cements to water-induced deterioration which comprises incorporating into the cement at least 0.02 and up to about 3 percent by weight of the cement of a water-soluble, polymeric polysulfonium composition containing in chemically combined form at least a substantial proportion of a monomer having the general formula:

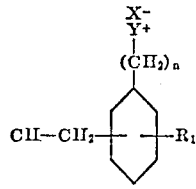

wherein $R_1$ is selected from the group consisting of hydrogen, halogens and alkyls having up to 6 carbon atoms, Y is a divalent, sulfur-containing, organic radical having its valences on the sulfur atom, said radical being derived from aliphatic and cycloaliphatic organic sulfides having from 2 up to 12 carbon atoms, X is a counter anion and $n$ is an integer from 1 to 4.

11. A method as in claim 10 wherein the polymeric polysulfonium composition is incorporated into a magnesium oxychloride cement which has been previously set by applying an aqueous solution of the polymeric polysulfonium composition to the cement.

12. A method as in claim 10 wherein the polymeric polysulfonium composition is incorporated into a magnesium oxychloride cement by adding the polymeric polysulfonium composition to the gauging solution employed in the preparation of the cement.

13. A method as in claim 10 with the additional step of heating the magnesium oxychloride cement composition having the polymeric polysulfonium composition incorporated therein at a temperature from about 40° to about 100° C.

References Cited in the file of this patent

UNITED STATES PATENTS

| | | |
|---|---|---|
| 2,242,785 | Kammuller et al. | May 20, 1941 |
| 2,865,876 | Scott | Dec. 23, 1958 |
| 2,895,925 | Hwa | July 21, 1959 |